(12) United States Patent
Greco et al.

(10) Patent No.: US 12,055,676 B2
(45) Date of Patent: Aug. 6, 2024

(54) TRANSPARENT OPTICAL PORTION, OPTICAL DEVICE AND METHOD FOR MANUFACTURING AN OPTICAL DEVICE

(71) Applicant: Sony Group Corporation, Tokyo (JP)

(72) Inventors: Tonino Greco, Stuttgart (DE); Klaus Zimmermann, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 331 days.

(21) Appl. No.: 17/435,395

(22) PCT Filed: Mar. 27, 2020

(86) PCT No.: PCT/EP2020/058759
§ 371 (c)(1),
(2) Date: Sep. 1, 2021

(87) PCT Pub. No.: WO2020/201111
PCT Pub. Date: Oct. 8, 2020

(65) Prior Publication Data
US 2022/0146711 A1   May 12, 2022

(30) Foreign Application Priority Data
Mar. 29, 2019 (EP) .................................... 19166222

(51) Int. Cl.
*G02B 1/00* (2006.01)
*G02B 1/02* (2006.01)

(52) U.S. Cl.
CPC .............. *G02B 1/002* (2013.01); *G02B 1/02* (2013.01)

(58) Field of Classification Search
CPC .................................. G02B 1/002; G02B 1/02

USPC .......................................................... 359/652
See application file for complete search history.

(56) References Cited

U.S. PATENT DOCUMENTS

| | | | |
|---|---|---|---|
| 2007/0257264 A1* | 11/2007 | Hersee | H01L 21/0265 257/E33.068 |
| 2016/0025914 A1 | 1/2016 | Brongersma et al. | |
| 2017/0082263 A1 | 3/2017 | Byrnes et al. | |
| 2018/0224574 A1 | 8/2018 | Lee et al. | |
| 2019/0086597 A1* | 3/2019 | Kawakami | G02B 1/005 |
| 2019/0196068 A1* | 6/2019 | Tsai | G02B 1/002 |
| 2019/0319430 A1* | 10/2019 | Na | G03B 21/001 |
| 2020/0225386 A1* | 7/2020 | Tsai | G02B 1/002 |
| 2021/0103141 A1* | 4/2021 | Chen | G02B 27/005 |
| 2021/0149081 A1* | 5/2021 | Groever | G02B 5/1842 |

FOREIGN PATENT DOCUMENTS

| | | |
|---|---|---|
| GB | 2470097 A | 11/2010 |
| WO | 2018/009258 A2 | 1/2018 |
| WO | 2018/153503 A1 | 8/2018 |
| WO | 2018/204856 A1 | 11/2018 |

OTHER PUBLICATIONS

International Search Report and Written Opinion mailed on Jul. 2, 2020, received for PCT Application PCT/EP2020/058759, Filed on Mar. 27, 2020, 10 pages.

* cited by examiner

*Primary Examiner* — William R Alexander
(74) *Attorney, Agent, or Firm* — XSENSUS LLP

(57) ABSTRACT

The present disclosure pertains to a transparent optical portion comprising a plurality of protrusion for providing a metalens function on a surface of an optical device, wherein a direction of growth of the plurality of protrusion is based on a crystal structure of a first substrate, and wherein the protrusions differ in size.

20 Claims, 4 Drawing Sheets

US 12,055,676 B2

TRANSPARENT OPTICAL PORTION, OPTICAL DEVICE AND METHOD FOR MANUFACTURING AN OPTICAL DEVICE

CROSS-REFERENCE TO RELATED APPLICATIONS

The present application is based on PCT filing PCT/EP2020/058759, filed Mar. 27, 2020, which claims priority to EP 19166222.0, filed Mar. 29, 2019, the entire contents of each are incorporated herein by reference.

TECHNICAL FIELD

The present disclosure generally pertains to a transparent optical portion for providing a metalens function, an optical device and a method for manufacturing an optical device.

TECHNICAL BACKGROUND

Metasurfaces have attracted interest in recent years, since may enable precise control of optical wavefronts and are easy to fabricate with conventional microfabrication technology in a flat, thin, and light weight form factor. Various conventional devices such as gratings and lenses have been demonstrated using metasurfaces. These optical elements are typically composed of large numbers of scatterers, or meta-atoms placed on a two-dimensional lattice to locally shape optical wavefronts. A metalens design is basically a nanostructure applied to a substrate that allows controlling the wavefront to derive the lens function.

Generally, transparent optical portions and metalenses are known. In contrast to conventional lenses with a continuous distribution of their composition material, known metalenses include a structured arrangement on a nanometer or micrometer scale, including nanopillars. The nanopillars may include $TiO_2$ is material with an exemplary pillar diameter ranging from 50 to 340 nm and a pillar height of 600 nm. Furthermore, a metalens can have a refractive index, due to their structure, which is smaller than one. It is known that the structured arrangement of nanopillars can be generally achieved with a microstamp in the context of UV-nanoimprint lithography. However, this process may be time-consuming and the microstamp wears out and may have to be replaced after a certain amount of uses in order to maintain a quality of the metalens. Therefore, known processes for manufacturing metalenses are generally expensive.

Although, techniques for providing metalenses are known, it is generally desirable to provide a process for manufacturing a transparent optical portion, an optical device, and a method for manufacturing an optical device.

SUMMARY

According to a first aspect, the disclosure provides a transparent optical portion comprising a plurality of protrusions for providing a metalens function on a surface of the optical device, wherein a direction of growth of the plurality of protrusions is based on a crystal structure of a first substrate, and wherein the protrusions differ in size.

According to a second aspect, the disclosure provides an optical device comprising: a transparent optical portion including a plurality of protrusions for providing a metalens function on a surface of the optical device, wherein a direction of growth of the plurality of protrusions is based on a crystal structure of a first substrate, and wherein the protrusions differ in size.

According to a third aspect, the disclosure provides a method for manufacturing an optical device including a transparent optical portion, the method comprising: growing, on a first substrate, a plurality of protrusion, wherein a direction of growth of the plurality of protrusions is based on a crystal structure of the first substrate, and wherein the protrusions differ in size.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
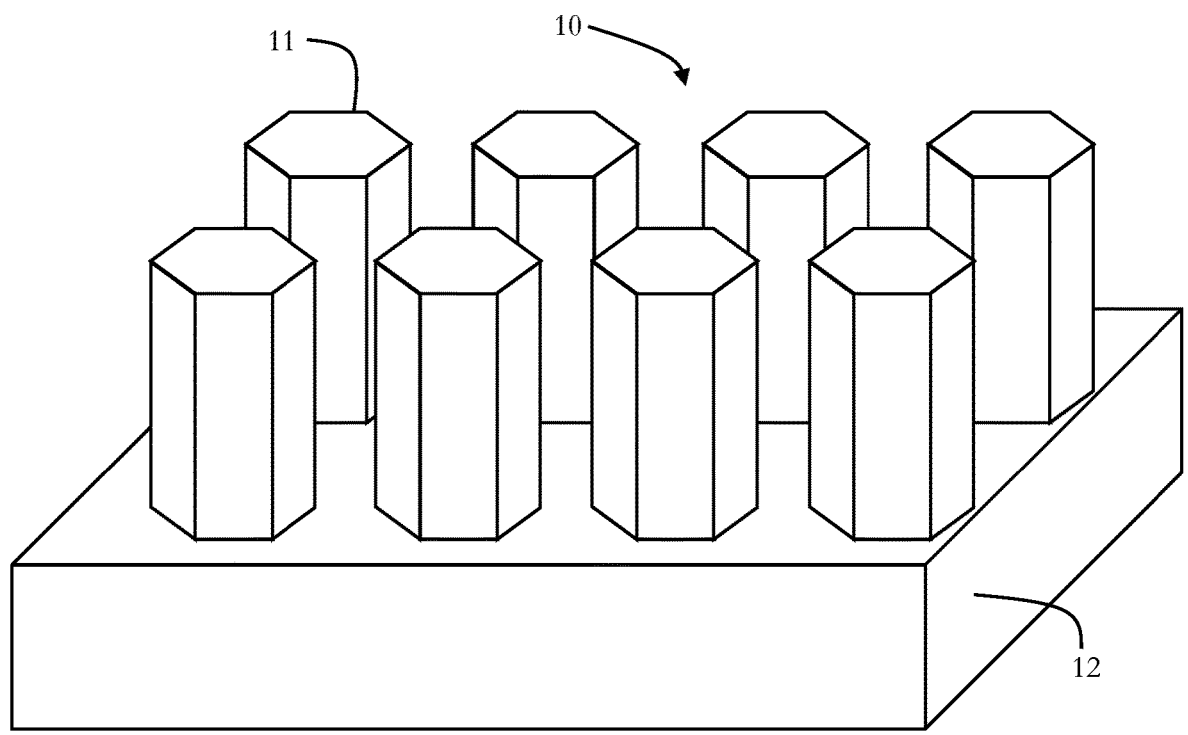
FIG. 2 shows a system according to the present disclosure.

Before a detailed description of the embodiments under reference of FIG. 2 is given, general explanations are made.

As already discussed above, it is desirable to provide a transparent optical portion, an optical device and a method for manufacturing an optical device. It has been acknowledged that known methods for manufacturing these optical devices and transparent optical portions are expensive and therefore, it is desirable to provide cost-saving processes.

Therefore, some embodiments pertain to a transparent optical portion comprising a plurality of protrusions for providing a metalens function on a surface of an optical device, wherein a direction of growth of the plurality of protrusions is based on a crystal structure of a first substrate, and wherein the protrusions differ in size.

As mentioned, a metalens may include a structured arrangement on a nanometer or micrometer scale (which may also be referred to as meta-material) and the metalens may have a refractive index, due to their structure, which is smaller than one. In principle, the metalens may provide a lens function, as generally known. The transparent optical portion having the metalens function may be suitable to transmit light of specific wavelengths (e.g. red, green, infrared, 430 nm) or a range of wavelengths (e.g. visible light, microwaves, 450 nm to 500 nm), and it may also transmit all the incident light (i.e. transmission of 100%), or only a fraction of the incident light (e.g. 50%). In more detail, in some embodiments, metasurfaces, which may be used for providing a metalens function, are typically thin optical components that rely on a different approach for light control: A dense arrangement of subwavelength resonators is designed to modify the optical response of the interface.

The resonant nature of the scatterers introduces an abrupt phase shift in the incident wavefront, making it possible to mold the scattered wavefront at will and enabling a new class of planar photonics components—flat optics. The metasurface approach may be distinct in that it provides continuous control of the phase profile (i.e., from 0 to 2π) with a binary structure (only two levels of thickness), circumventing the fundamental limitation of multiple diffraction orders while maintaining the size, weight, and ease-of-fabrication advantages of planar diffractive optics. However, metasurface-based optical devices demonstrated so far may be affected by chromatic aberrations, but research efforts have also shown that relatively broadband optical metasurfaces can be achieved.

The term "transparent" may generally refer to a property of the optical portion to transmit light (i.e. pass light through the optical portion). However, it may only refer to a transmission of a certain wavelength (range) of light (e.g. visible light, green light, infrared light). Also, it may refer to a transmission of all of the light, which is incident on the optical portion (i.e. a transmission of 100 percent) or only a fraction of the incident light (e.g. 90 percent).

The optical portion may be a single unit of, for example, a lens, or it may include several lenses or units which in combination provide a (meta-)lens function, for example by a stacked arrangement or a side-by-side arrangement, or the like.

The plurality of protrusions may be any number of protrusions, which is suitable for providing a metalens function (e.g. 100), wherein a protrusion refers to an unevenness, a nanopillar, or the like, of a substrate material, which is grown in order to provide the metalens function.

The protrusions may have a diameter from about 50 to 340 nm and a height of about 600 nm without limiting the present disclosure in that regard, and the diameter of the height of the protrusions may be freely adapted to a specific need and characteristic for the metalens function.

The surface of the optical device may be any surface of the optical device and it may be at least one surface of the optical device, such as a front surface, a back surface, a side surface. Also, in some embodiments, several optical portions may be provided on different surfaces of the optical device.

The direction of growth of the plurality of protrusions may be based on an epitaxial growth process, as it is generally known for epitaxial growth, and, thus, may be basically perpendicular to the surface of the optical device.

The first substrate may be or may include a metal, a semiconductor, a salt, or the like, which intrinsically includes a crystal structure, such as silicon, or oxides including silicon, titanium or oxides including titanium, gallium, gallium nitride, or the like. The first substrate may also be a mix, an alloy, or the like, of these or other materials. The epitaxial growth of the plurality or protrusions may be influenced by the crystal structure of the first substrate, as it is in principle known for epitaxial growth.

The material of the first substrate may be chosen depending on the desired optical parameters, which are desired, such as numerical aperture, refractive index, or the like.

Generally, the protrusions may differ in size. The size may refer to a diameter, a height, or the like of a protrusion, depending on the geometry of the protrusion. For example, if the protrusion is of a cylindrical shape, it may be sufficient to characterize the protrusion by its diameter and height. However, for more complex geometrical shapes, at least two height and/or at least two diameters and/or other parameters, such as curvature, or the like may be required to characterize the protrusion. The size of a single protrusion of the plurality of protrusions may be, for example, in a nanometer or micrometer range, such that the plurality of protrusions may provide a microlens function.

The size of the protrusions may be chosen depending on desired optical characteristics of the transparent optical portion, such as refractive index, numerical aperture, or the like. By differing the sizes of the protrusions, for example, a plurality of refractive indexes may be achieved on the transparent optical portion, as it may be desired in order to correct lens errors, such as chromatic aberration, spherical aberration, distortion, or the like.

In some embodiments, the first substrate includes gallium nitride, as already described.

Thereby, known processes for the growth of nanopillars including gallium nitride may be utilized (such as epitaxial growth). Moreover, gallium nitride has similar optical properties as titanium oxide, which is known in the microlens fabrication.

In some embodiments, the size is at least one of diameter and height, as described herein.

In some embodiments, the size of a protrusion of the plurality of protrusions is based on the position of the protrusion. As already explained, the refractive index may depend on the size of the protrusions. In order to vary the refractive index depending on the position on the transparent optical portion, the size of the protrusion may be varied. The position of the protrusion may also include a positional relationship between the protrusions. For instance, protrusions may be arranged in circularly around a common center and the size may depend on the diameter on the associated circle at which the protrusions are arranged.

Some embodiments pertain to an optical device comprising: a transparent optical portion including a plurality of protrusions for providing a metalens function on a surface of an optical device, wherein a direction of growth of the plurality of protrusions is based on a crystal structure of a first substrate, and wherein the protrusions differ in size, as described herein.

In some embodiments the optical device includes a second substrate including silicon. Thereby, known techniques and circuitry for reading or processing a photoelectric signal may be implemented in addition to the transparent optical portion, as described herein.

Therefore, in some embodiments, the optical device further includes circuitry for processing a photoelectric signal.

In some embodiments the transparent optical portion a bonded onto each other. The bonding may be achieved with known techniques, such as plasma activated bonding, direct bonding, adhesive bonding, anodic bonding, eutectic bonding, glass frit bonding, thermocompression bonding, transient liquid phase diffusion bonding, surface activated bonding, or the like.

Some embodiments pertain to a method for manufacturing an optical device including a transparent optical portion, the method comprising: (epitaxial) growing, on a first substrate, a plurality of protrusion, wherein a direction of growth of the plurality of protrusions is based on a crystal structure of the first substrate, and wherein the protrusions differ in size, as described herein.

The growing may be based on a Metal-Organic Chemical Vapour Deposition (MOCVD) method, as it is generally known. The growing may be performed in a MOCVD reactor, such that in some embodiments, the growing of the plurality of protrusions may be even performed on a twelve inch wafer (without limiting the present disclosure in that regard, and, of course, any other size of wafers may be used).

Furthermore, in some embodiments, the plurality of protrusions is grown on the basis of a selective-area metal organic vapor phase epitaxy (SA-MOVPE), which allows a well-defined size- and position-controlled (semiconductor) nanostructures. For instance, by optimizing growth condition, a growth direction can be controlled and therefore axial and radial heterostructures can be obtained. The protrusions may be configured as nanopillars having a hexagonal cross-section.

In some embodiments, the method further includes bonding the first substrate and a second substrate onto each other, the second substrate including silicon, as described herein. In the second substrate, for example, circuitry may be provided for driving and read-out of units/elements provided on the first substrate. Hence, the first substrate and the second substrate may be manufactures independently from each other and, for instance, the may refer to a first wafer and a second wafer.

In some embodiments, the method further includes providing circuitry for processing a photoelectric signal generated in the optical device, as described herein. This circuitry may be provided on the second substrate.

Hence, in some embodiments, a direct growth of the nanostructure protrusions, e.g. on twelve inch wafers, using an established epitaxy process technology may allow a fast manufacturing and/or lower costs compared to nanoimprint lithography.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Figure 1:
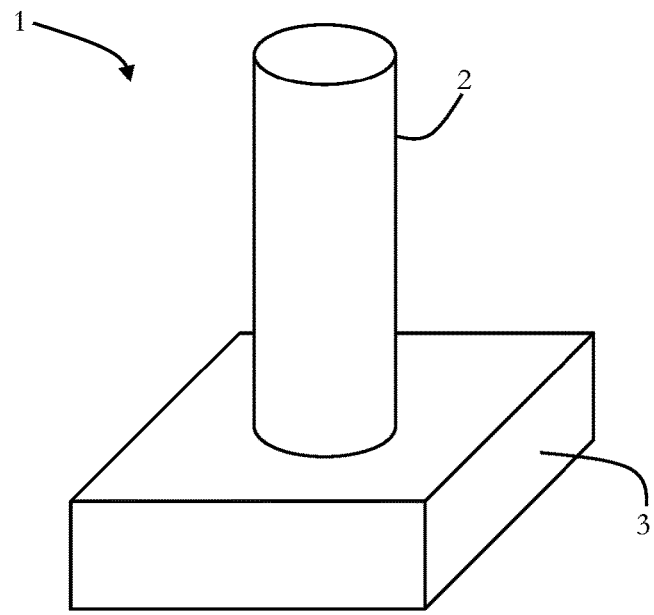
FIG. 1 shows a system as it is generally known.

FIG. 1 shows a system 1, as it is generally known, including a nanopillar 2 including titanium oxide and a substrate 3 including silicon oxide.

In general, a microlens includes a plurality of nanopillars, such as the nanopillar 2, on the substrate 3. The nanopillars are manufactured by UV-nanoimprint lithography, i.e. by first creating a lens nanostructure on a phot resist on a master stamper in a time-consuming electron beam lithographic process (EBL), wherein the master stamper can make use of different materials (e.g. Si, $SiO_2$) depending on the application and it is typically provided on a four inch wafer. The master stamper is then used to create "working stampers" by copying, wherein the working stampers may be provided on an eight inch wafer. Subsequently, the working stampers are used for stamping a UV curable resist which is provided on the substrate 3 and then the structured is cured by performing a UV curing. In total, this is a time consuming process. Moreover, the stamp needs to be renewed in a predetermined time since it wears out. Furthermore, this process is usually performed on an eight inch wafer, or on an even smaller wafer, as discussed, and cannot be easily provided on a twelve inch wafer. All of these are factors which increase the costs and time for manufacturing of known micro-lenses.

FIG. 2 shows a system 10 plurality of protrusions configured as nanopillars 11 according to the present disclosure, which are formed by epitaxial growth. The nanopillars 11 are shown to have the same size for simplification reasons, but as already described above, they are not confined to have the same size. The system 10 further includes a substrate 12, which includes the same material as the nanopillars 11, namely Gallium-Nitride in this embodiment. The nanopillars 11 are epitaxially grown out of the substrate 12. The nanopillars 11 have dimensions in the nanometer region, e.g. a width of about 80 nm and a height of about 600 nm, wherein these numbers are only give for illustration purposes and the present disclosure is not limited to any specific dimensions, as long as the nanopillars 11 are able to provide the metalens function.

Figure 3:
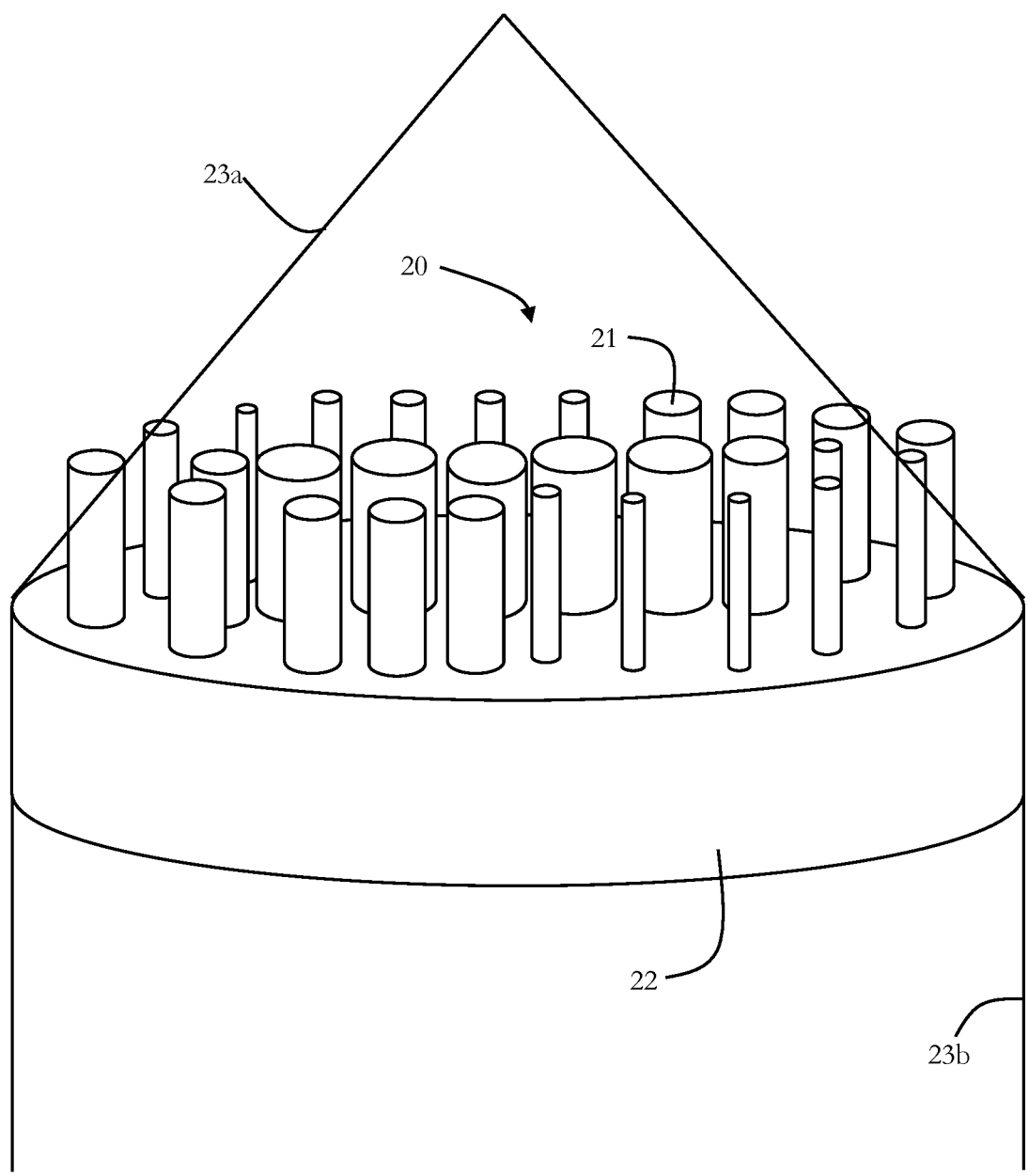
FIG. 3 shows a transparent optical portion according to the present disclosure.

FIG. 3 shows a transparent optical portion 20 according to the present disclosure, including a plurality of nanopillars 21 (protrusions), such as the nanopillars of FIG. 2, and a substrate 22. For simplicity, the nanopillars are depicted cylindrical. However, the structure of the nanopillars is dependent on the crystal structure of the substrate 22, as described above, wherein in this embodiment it is assumed that the nanopillars 21 and the substrate 22 are formed on the basis of Gallium-Nitride by epitaxial growth. To provide different refractive indices on the transparent optical portion, the diameter of the nanopillars 21 is varied at different positions of the transparent optical portion 20. It should be noted that the depicted size distribution of the nanopillars is only for an illustrational purpose, and, in general, the every other distribution is possible.

FIG. 3 further illustrates a light beam 23a, which is incident on the transparent optical portion 20 and a collimated light beam 23b, which is transmitted through the transparent optical portion 20 and collimated by the optical portion 20 having the metalens function.

Figure 4:
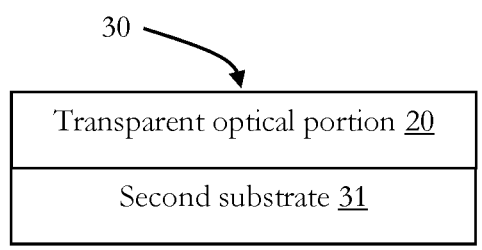
FIG. 4 shows an optical device according to the present disclosure.

FIG. 4 shows a configuration of an optical device 30 according to the present disclosure. The optical device 30 includes the transparent optical portion 20 of FIG. 3 and a second substrate, wherein, in this embodiment, the second substrate 31 is a semiconductor substrate including silicon, and further including circuitry to process a photoelectric signal, as described herein. The transparent optical portion 20 and the second substrate 31 are stacked by a plasma bonding process onto each, thereby providing a stacked image sensor.

Figure 5:
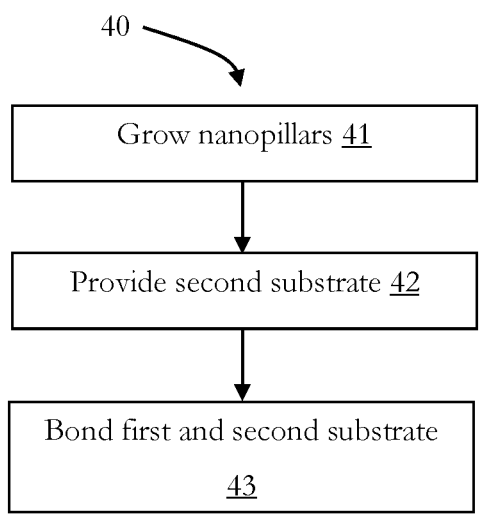
FIG. 5 shows a method for manufacturing an optical device according to the present disclosure.

FIG. 5 shows a method 40 of manufacturing an optical device according to the present disclosure, such as the optical device 30 of FIG. 4.

In 41, on a Gallium-Nitride wafer (first substrate), a plurality of protrusions (nanopillars) including Gallium-Nitride is epitaxially grown, wherein the size of each nanopillar of the plurality of nanopillars depends on the position of the respective nanopillar, in order to provide a defined metalens function.

In 42, a second substrate including silicon and further circuitry for signal processing of signals received from the first substrate is provided, e.g. for processing photoelectric signals generated in the first substrate.

In 43, the first substrate and a second substrate including silicon are bonded onto each other.

Figure 6:
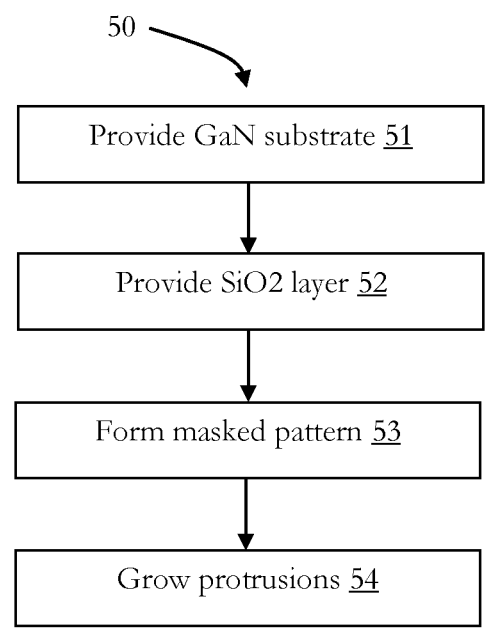
FIG. 6 is a flowchart of a method for manufacturing protrusions.

In the following, the manufacturing of the plurality of protrusions as of 41 in FIG. 5 will be explained for a manufacturing method 50 of the plurality of protrusions under reference of FIG. 6, showing a flowchart of method 50.

At 51, a Gallium-Nitride substrate is provided.

At 52, a $SiO_2$ layer is provided on the GaN substrate by sputtering.

At 53, a masked pattern is formed by electron beam lithography and wet etching. The masked pattern is configured such that the desired protrusion pattern for providing the metalens function can be formed.

At 54, the masked pattern is loaded into a horizontal low-pressure MOVPE system for the epitaxial growth of the plurality of protrusions, wherein the material is GaN in this embodiment for providing the plurality of protrusions.

It should be recognized that the embodiments describe methods with an exemplary ordering of method steps. The specific ordering of method steps is however given for illustrative purposes only and should not be construed as binding. For example the ordering of 43 and 44 in the embodiment of FIG. 5 may be exchanged. Also, the ordering of 41, 44 and 45 in the embodiment of FIG. 5 may be exchanged. Other changes of the ordering of method steps may be apparent to the skilled person.

Please note that the division of the optical device 30 into units 20 and 31 is only made for illustration purposes and that the present disclosure is not limited to any specific division of functions in specific units.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A transparent optical portion comprising a plurality of protrusions for providing a metalens function on a surface of an optical device, wherein
 a direction of growth of the plurality of protrusions is based on a crystal structure of a first substrate, and wherein
 the protrusions differ in size.

(2) The optical device according to (1), wherein the first substrate includes Gallium Nitride.

(3) The optical device according to anyone of (1) or (2), wherein the size of a protrusion of the plurality of protrusions is based on the position of the protrusion.

(4) The optical device according to anyone of (1) to (3), wherein the size is at least one of diameter and height.

(5) An optical device comprising:
 a transparent optical portion including a plurality of protrusions for providing a metalens function on a surface of an optical device, wherein
 a direction of growth of the plurality of protrusions is based on a crystal structure of a first substrate, and wherein
 the protrusions differ in size.

(6) The optical device according to (5), further comprising a second substrate including silicon.

(7) The optical device according to anyone of (5) or (6), further comprising circuitry for processing a photoelectric signal.

(8) The optical device according to anyone of (5) to (7), wherein the transparent optical portion and the second substrate are bonded onto each other.

(9) A method for manufacturing an optical device including a transparent optical portion, the method comprising:
 growing, on a first substrate, a plurality of protrusion, wherein
 a direction of growth of the plurality of protrusions is based on a crystal structure of the first substrate, and wherein
 the protrusions differ in size.

(10) The method according to (9), wherein the first substrate includes Gallium Nitride.

(11) The method according to anyone of (9) or (10), wherein the size of a protrusion of the plurality of protrusions is based on the position of the protrusion.

(12) The method according to anyone of (9) to (11), wherein the size is at least one of diameter and height.

(13) The method according to anyone of (9) to (12), further comprising:
 bonding the first substrate and a second substrate onto each other, the second substrate including silicon.

(14) The method according to anyone of (9) to (13), further comprising:
 providing circuitry for processing a photoelectric signal generated in the optical device.

The invention claimed is:

1. An optical device comprising:
 a transparent optical portion including a plurality of protrusions for providing a metalens function on a surface of an optical device, wherein
 a direction of growth of the plurality of protrusions is based on a crystal structure of a first substrate, and wherein
 the protrusions differ in size; and
 circuitry for processing a photoelectric signal.

2. The optical device according to claim 1, further comprising a second substrate including silicon, the circuitry for processing a photoelectric signal being on the second substrate.

3. The optical device according to claim 1, further comprising a second substrate, the circuitry for processing a photoelectric signal being on the second substrate, and wherein the transparent optical portion and the second substrate are bonded onto each other.

4. The optical device according to claim 1, wherein the first substrate includes Gallium Nitride.

5. The optical device according to claim 1, wherein the size of a protrusion of the plurality of protrusions is based on the position of the protrusion.

6. The optical device according to claim 1, wherein the size is at least one of diameter and height.

7. The optical device according to claim 1, wherein the metalens function collimates light incident thereon.

8. The optical device according to claim 1, further comprising a second substrate, the circuitry for processing a photoelectric signal being on the second substrate, wherein the metalens function directs light incident thereon to the second substrate.

9. The optical device according to claim 8, wherein the first substrate and the second substrate are made of different materials.

10. The optical device according to claim 1, further comprising a second substrate, the circuitry for processing a photoelectric signal being on the second substrate.

11. The optical device according to claim 1, wherein the circuitry for processing a photoelectric signal processes a photoelectric signal generated by the optical device.

12. A method for manufacturing an optical device, the method comprising:
 growing, on a first substrate, a plurality of protrusion serving as a transparent optical portion for providing a metalens function on a surface of the optical device, wherein
 a direction of growth of the plurality of protrusions is based on a crystal structure of the first substrate, and wherein
 the protrusions differ in size; and
 providing circuitry for processing a photoelectric signal generated in the optical device.

13. The method according to claim 12, wherein the first substrate includes Gallium Nitride.

14. The method according to claim 12, wherein the size of a protrusion of the plurality of protrusions is based on the position of the protrusion.

15. The method according to claim 12, wherein the size is at least one of diameter and height.

16. The method according to claim 12, further comprising:
   bonding the first substrate and a second substrate onto each other, the second substrate including silicon.

17. The method according to claim 16, wherein the circuitry for processing a photoelectric signal generated in the optical device is on the second substrate.

18. The method according to claim 12, further comprising:
   bonding the first substrate and a second substrate onto each other.

19. The method according to claim 18, wherein the first substrate and the second substrate are made of different materials.

20. The method according to claim 18, wherein the circuitry for processing a photoelectric signal generated in the optical device is on the second substrate.

* * * * *